US009499286B2

(12) United States Patent
Parrish et al.

(10) Patent No.: US 9,499,286 B2
(45) Date of Patent: *Nov. 22, 2016

(54) TWO-PIECE HELICAL FEEDER TUBE FOR FILLING CONTAINERS WITH PILLS

(71) Applicant: Aylward Enterprises, LLC, New Bern, NC (US)

(72) Inventors: David Parrish, Youngsville, NC (US); John Winters, Winston-Salem, NC (US); Greg Wile, New Bern, NC (US); Brian Tomlinson, New Bern, NC (US)

(73) Assignee: Aylward Enterprises, LLC, New Bern, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/742,163

(22) Filed: Jun. 17, 2015

(65) Prior Publication Data

US 2015/0284113 A1    Oct. 8, 2015

Related U.S. Application Data

(63) Continuation of application No. 14/227,885, filed on Mar. 27, 2014, now Pat. No. 9,102,457, which is a continuation of application No. 13/445,225, filed on Apr. 12, 2012, now abandoned.

(60) Provisional application No. 61/475,048, filed on Apr. 13, 2011.

(51) Int. Cl.
| | |
|---|---|
| *B65G 59/00* | (2006.01) |
| *B65D 83/04* | (2006.01) |
| *B23P 11/00* | (2006.01) |
| *B23P 17/00* | (2006.01) |
| *B65B 39/00* | (2006.01) |
| *B65G 33/04* | (2006.01) |

(Continued)

(52) U.S. Cl.
CPC .................. *B65B 1/06* (2013.01); *B23P 11/00* (2013.01); *B23P 17/00* (2013.01); *B65B 39/007* (2013.01); *B65D 83/04* (2013.01); *B65G 11/063* (2013.01); *B65G 59/00* (2013.01); *B65G 33/04* (2013.01); *Y10T 29/49826* (2015.01); *Y10T 29/49879* (2015.01); *Y10T 29/49881* (2015.01)

(58) Field of Classification Search
CPC ........ B65D 83/04; B23P 11/00; B23P 17/00; B65G 59/00; B65G 33/04; B65B 39/00
See application file for complete search history.

(56) References Cited

U.S. PATENT DOCUMENTS

| | | |
|---|---|---|
| 2,400,419 A | 5/1946 | Hohl et al. |
| 5,213,232 A | 5/1993 | Kraft et al. |
| 5,513,737 A | 5/1996 | Morimoto et al. |

(Continued)

FOREIGN PATENT DOCUMENTS

EP    1 391 386 A2    2/2004

*Primary Examiner* — Mark A Deuble
(74) *Attorney, Agent, or Firm* — Alston & Bird LLP

(57) ABSTRACT

One embodiment of the present invention relates to a method of manufacturing a pill delivery apparatus. The method includes providing an inner core having an outer surface and providing an outer sleeve comprising an opening defined therethrough, the outer sleeve having an inner surface. Further, the method includes defining a passageway on the outer surface of the inner core such that positioning the outer sleeve over the inner core defines a delivery chute for delivering a plurality of pills between the passageway and the inner surface of the outer sleeve.

7 Claims, 5 Drawing Sheets

(51) Int. Cl.
   *B65B 1/06* (2006.01)
   *B65G 11/06* (2006.01)

(56) References Cited

U.S. PATENT DOCUMENTS

| | | | |
|---|---|---|---|
| 6,116,401 A | 9/2000 | Carleton | |
| 6,851,911 B2 | 2/2005 | Lhoest | |
| 7,007,821 B2 | 3/2006 | Aylward | |
| 7,066,350 B2 | 6/2006 | Aylward | |
| 7,124,912 B2 | 10/2006 | Aylward | |
| 7,455,166 B2 | 11/2008 | Seiffert et al. | |
| 7,892,473 B2 | 2/2011 | Aylward | |
| 8,066,150 B2 | 11/2011 | Clarke et al. | |
| 2006/0201774 A1* | 9/2006 | Seiffert | B65B 5/103 193/32 |
| 2011/0120354 A1 | 5/2011 | Riemens et al. | |

\* cited by examiner

TWO-PIECE HELICAL FEEDER TUBE FOR FILLING CONTAINERS WITH PILLS

CROSS-REFERENCE TO RELATED APPLICATIONS

This application claims the benefit of U.S. application Ser. No. 14/227,885 entitled "Two-Piece Helical Feeder Tube for Filling Containers with Pills," filed Mar. 27, 2014; U.S. Provisional Application No. 13/445,225 entitled "Two-Piece Helical Feeder Tube for Filling Containers with Pills," filed Apr. 12, 2012; and U.S. Provisional Application No. 61/475,048 entitled "Two-Piece Helical Feeder Tube Containers with Pills," filed Apr. 13, 2011, the contents of each of which are incorporated herein in their entirety.

BACKGROUND OF THE INVENTION

1) Field of the Invention

The present invention relates to pill packaging and, more particularly, to apparatuses and methods for delivering and packaging pills, tablets, capsules, and the like.

2) Description of Related Art

Pharmaceutical products such as pills, tablets, capsules, caplets, gel caps, dragees, and the like are often packaged in containers such as bottles, pouches, blister packages, sachets, or boxes. Each container may comprise a plurality of pill receptacles that are to be individually filled with one or more pills. This procedure is preferably performed by an automated machine capable of precisely and accurately delivering the pills at a high rate of speed. Conventional packaging machines include a plurality of dispensing tubes and chutes that guide the pills toward the pill receptacles. Precise orientation and placement of the pills can be critical to the process, for example when the pills are placed into a disposable pouch that is subsequently covered with foil. A packaging apparatus may include a tray for supporting an accumulation of pills over a drop chute. The tray is reciprocally raised and lowered to cause the pills to fall through an opening in the tray and into a tube that extends through the opening of the tray. The pills fall through the tube and into the drop chute, which guides the pills toward a container.

Although this type of feeder has achieved commercial acceptance, problems may arise if the tube or drop chute becomes blocked with pills. Blockage of the tube or drop chute can occur if adjacent pills shingle upon one another. Shingling occurs when a pill becomes wedged between an adjacent pill and the wall of the tube or chute. For example, shingling can occur in a dispensing tube where the pills are stopped by pins that control the rate of release of the pills. The shingling of the pills prevents the pills from falling though the tube when the pins are retracted from the tube. Further, blockage of the tube or drop chute may arise if the surface of the tube or drop chute is too rough, which impedes the motion of the pills. Blockage within the tubes can increase maintenance costs, reduce the speed of the packaging process, and cause some pill receptacles to go unfilled. Unfilled pill receptacles result in defective packages, which may necessitate rework, thereby increasing packaging costs.

In order to reduce the likelihood of blockage, some tubes are designed to be only slightly larger than the pills that fall therethrough so that there is insufficient space between a pill and the wall of the tube for another pill to fit. However, the size of the pills is determined in part by the composition of the pill material, and therefore pill sizes may vary from lot to lot. Thus, keeping the tube size closely matched to the pill size can necessitate different sized tubes for different lots, even if successive lots contain similar pills. The need for additional tubes increases the average expense of operating the machine. Additionally, changing the tubes between each lot requires stopping the machine and, hence, decreases the throughput. Moreover, shingling can still occur even when tubes are changed for each lot, especially if there are variations in pill size within a single lot of pills. The particular characteristics of some pills, such as shape, hardness, surface roughness, and the like, can also increase the likelihood of shingling.

Thus, there is a need for an improved packaging apparatus for delivering and placing pills and the like into pill receptacles and containers. Such an apparatus should not have the disadvantages associated with conventional systems and should be able to precisely and reliably place pills into pill receptacles in a desired orientation. Such an apparatus should decrease the risk of blockage of pills within the tube, for example, by shingling, and should also increase the likelihood and efficiency of delivering pills into the tube. Further, such an apparatus should be easy to fabricate and should be constructed from durable materials.

BRIEF SUMMARY OF THE INVENTION

Embodiments of the present invention are directed to a method of manufacturing a feeder tube for a pill delivery apparatus. In one embodiment, the method comprises providing an inner core having an outer surface and providing an outer sleeve comprising an opening defined therethrough, the outer sleeve having an inner surface. Further, the method includes defining a passageway on the outer surface of the inner core such that positioning the outer sleeve over the inner core defines a delivery chute for delivering a plurality of pills between the passageway and the inner surface of the outer sleeve. Another embodiment of the present invention includes a method of forming an opening in an outer tube so as to define the outer sleeve. One embodiment of the present invention includes forming at least one aperture in the outer sleeve and through an opening, the aperture being configured to receive a pin therethrough such that the pin extends into the passageway of the inner core.

According to one embodiment, the method may further comprise defining a helical passageway within the outer surface of the inner core so as to define a helical delivery chute between the helical passageway and the inner surface of the outer sleeve. In another embodiment, the inner core and the outer sleeve each comprises an inlet side and an exit side, the helical passageway extending between the inlet side and the exit side of the inner core. Further, the helical delivery chute may be configured to rotate each pill at least one revolution as the pill proceeds therethrough and deliver pills therethrough such that each of a plurality of pills successively delivered through the helical delivery chute is oriented at successive rotational positions along the helical delivery chute so as to prevent jamming of the pills with respect to the other pills in the delivery chute. Further, the passageway may be a helical passageway disposed offset from a centerline of the inner core.

According to one embodiment, the method may further comprise forming an inner core from a material, such as aluminum, to define an inner core for delivering pills to a container, the inner core having an inlet side and an exit side opposed to the inlet side and defining a passageway extending between the inlet side and the exit side. Further, the method may comprise forming an outer sleeve from a material, such as aluminum, to define an outer sleeve having an opening therethrough, the outer sleeve having an inner surface. In another embodiment, the method may further comprise forming an inner core and an outer sleeve from a plastic material.

Another aspect of the present invention may include a pill delivery apparatus comprising an inner core having an outer surface and a passageway defined on the outer surface thereof, and an outer sleeve comprising an opening defined therethrough, the outer sleeve having an inner surface. Further, the outer sleeve may be configured to be positioned over the inner core such that a delivery chute for delivering pills is defined between the passageway and the inner surface of the outer sleeve. The apparatus may further comprise a helical passageway defined within the outer surface of the inner core so as to define a helical delivery chute between the helical passageway and the inner surface of the outer sleeve. Further still, the helical passageway may be disposed offset from a centerline of the inner core.

Another embodiment of the present invention may include a method of assembling a pill delivery apparatus. The method may comprise providing an inner core having an outer surface and a passageway defined on the outer surface thereof and providing an outer sleeve comprising an opening defined therethrough, the outer sleeve having an inner surface. Further, the method may comprise positioning the outer sleeve over the inner core such that a delivery chute for delivering pills is defined between the passageway and the inner surface of the outer sleeve.

In another embodiment, the method may further comprise operably engaging at least one of the inner core or the outer sleeve with a tray adapted to contain a plurality of pills thereon. The delivery chute may be configured to deliver each pill among the plurality of pills within the tray to a container. Further, the method may include engaging a pin within an aperture defined in the outer sleeve such that the pin extends into the passageway.

Another embodiment of the present invention is directed to a feeder tube adapted to deliver pills to a container, the feeder tube comprising an inner core having an outer surface and a passageway defined on the outer surface thereof. The feeder tube may also include an outer sleeve comprising an opening defined therethrough, the opening including an inner surface. In addition, the outer sleeve may be configured to be positioned over the inner core such that a delivery chute for delivering pills is defined between the passageway and the inner surface of the outer sleeve.

One embodiment of the present invention includes a method of delivering pills comprising delivering a plurality of pills through a delivery chute to at least one container. The delivery chute may be defined between an inner core and an outer sleeve positioned over the inner core, wherein a passageway is defined in an outer surface of the inner core such that the delivery chute is defined between the passageway and an inner surface of an opening defined in the outer sleeve.

BRIEF DESCRIPTION OF THE SEVERAL VIEWS OF THE DRAWING(S)

Having thus described the invention in general terms, reference will now be made to the accompanying drawings, which are not necessarily drawn to scale. The drawings are exemplary only, and should not be construed as limiting the invention.

FIG. 3b is a side view of the exemplary pill for use with embodiments of the present invention, as shown in FIG. 3a;

DETAILED DESCRIPTION OF THE INVENTION

The present invention now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements Like numbers refer to like elements throughout.

Figure 4:
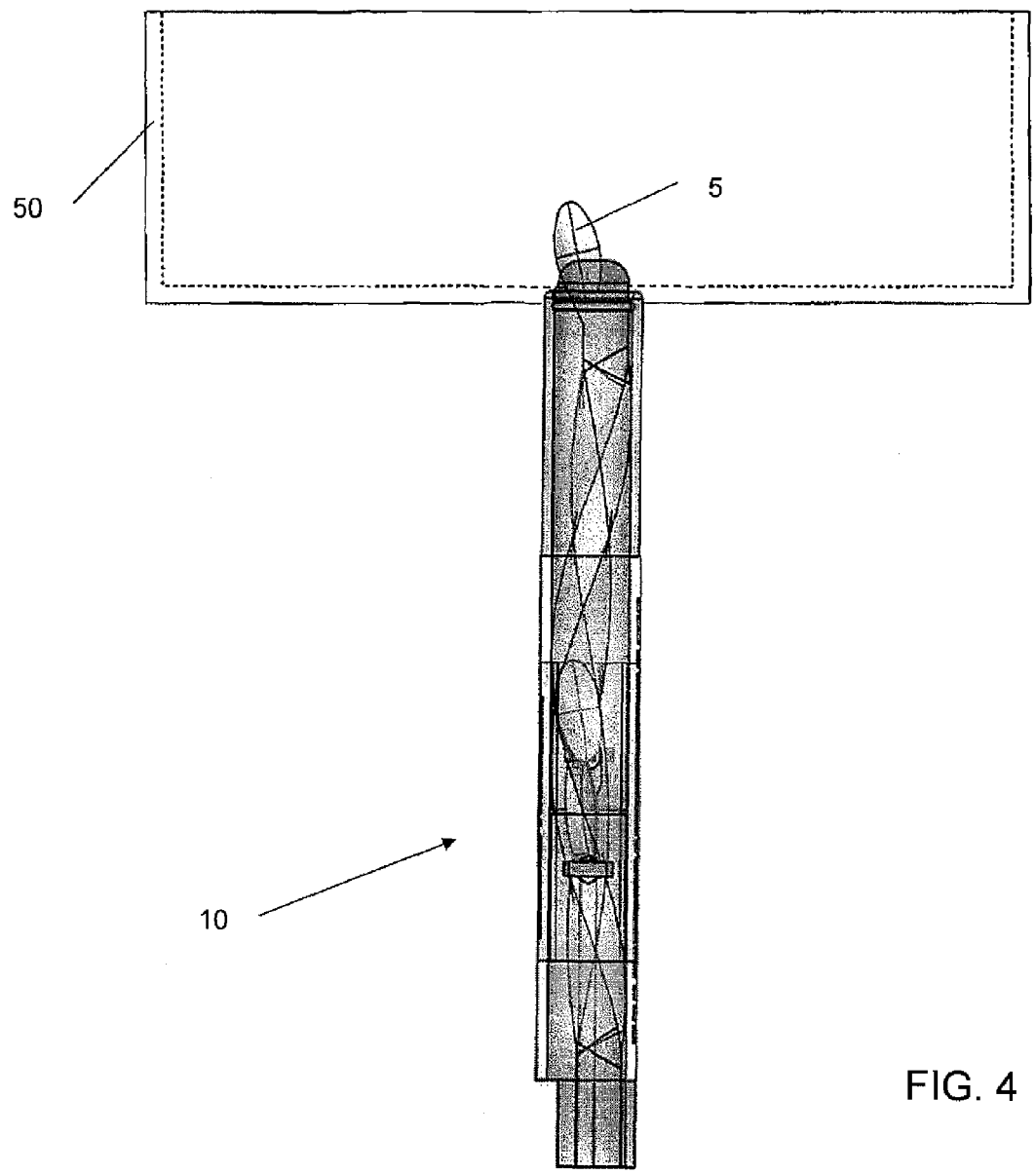
FIG. 4 is a side view of an exemplary pill delivery apparatus according to one embodiment of the present invention.
Figure 5:
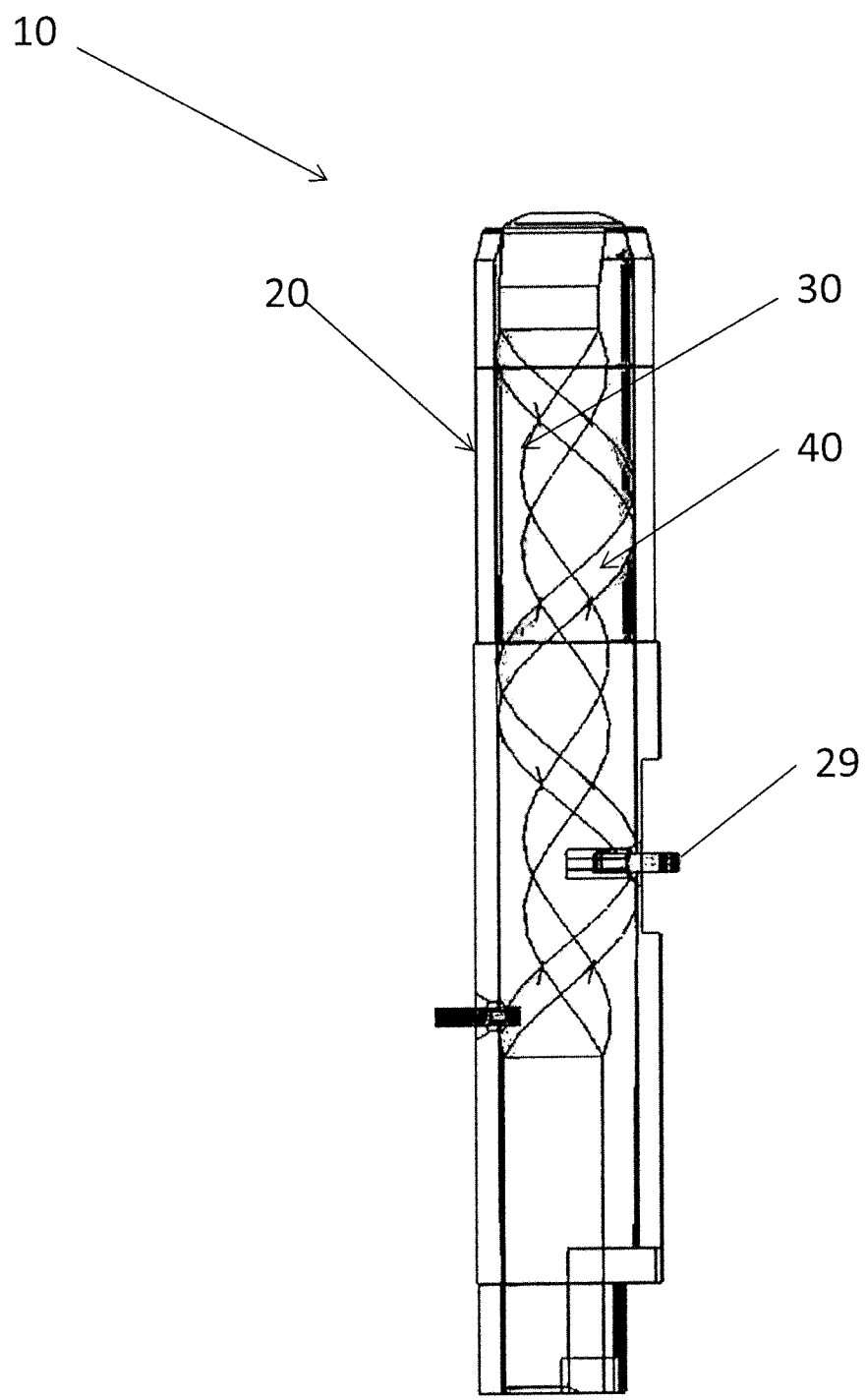
FIG. 5 is a cross-sectional view of a feeder tube according to an embodiment of the invention.

Embodiments of the present invention may provide improvements over the prior art by, among other things, providing a feeder tube 10 for a pill delivery apparatus for delivering pills 5 from a tray 50 to a plurality of pill receptacles in containers, as shown in FIG. 4. One embodiment of such a feeder tube 10 is shown in FIG. 1, which as described in greater detail below, provides an improved technique for delivering pills to containers.

The term "pill" is used herein throughout, but this term is not intended to be limiting and includes any discrete articles of the type used in the pharmaceutical industry or otherwise including, but not limited to, capsules, caplets, gel caps, dragees, and tablets. Similarly, the receiving container can be any one of a number of configurations that provide an opening for receiving pills 5 therein, such as bottles, pouches, blister packages, sachets, or boxes. Each container may comprise a plurality of individual pill receptacles that are to be separately filled with one or more pills 5, as is the case for a multi-receptacle disposable pouch. Alternatively, each container may receive a plurality of pills 5 into a single common space, as is the case for a conventional pill bottle.

Figure 1:
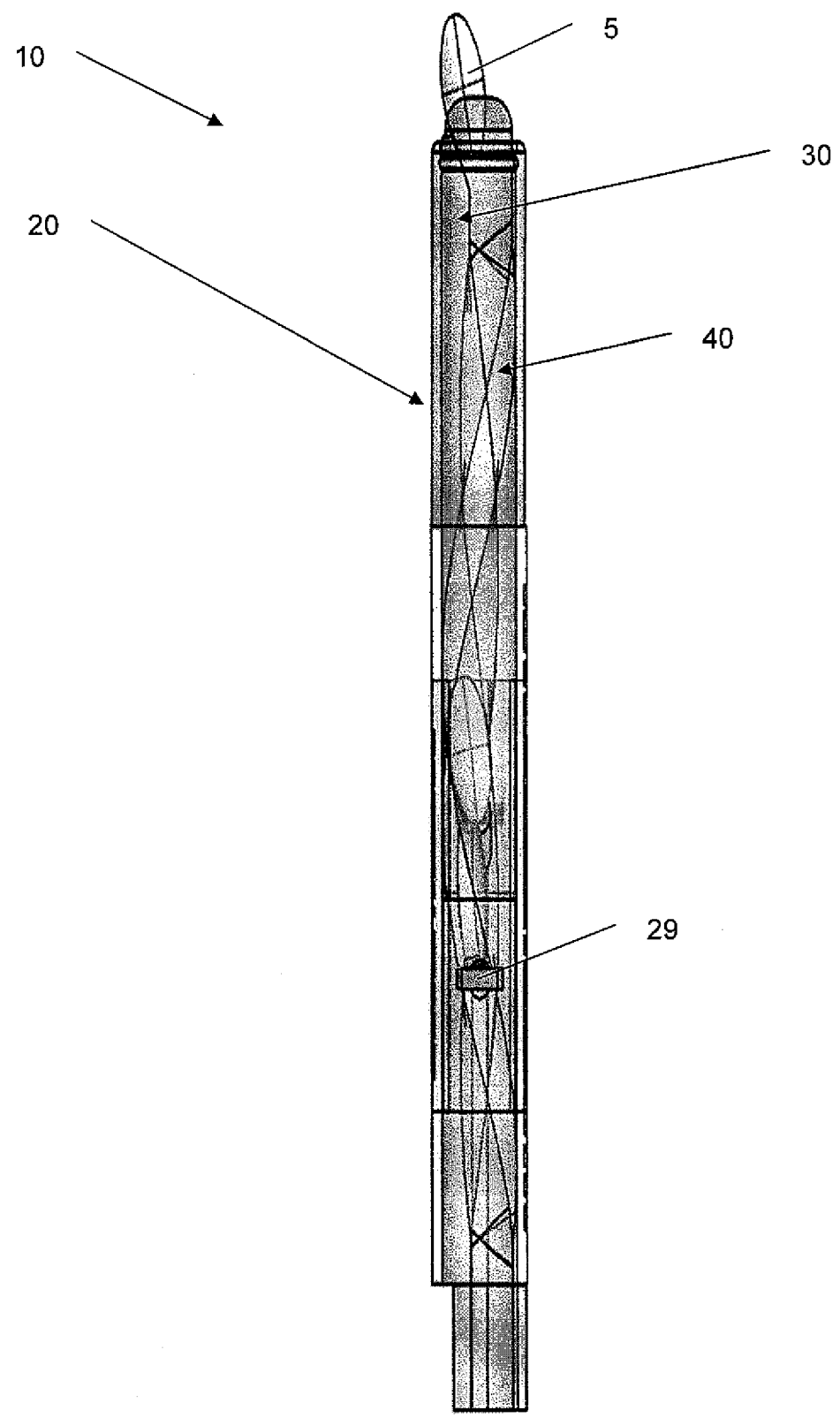
FIG. 1 is a cross-sectional view of a feeder tube according to one embodiment.
Figure 2A:
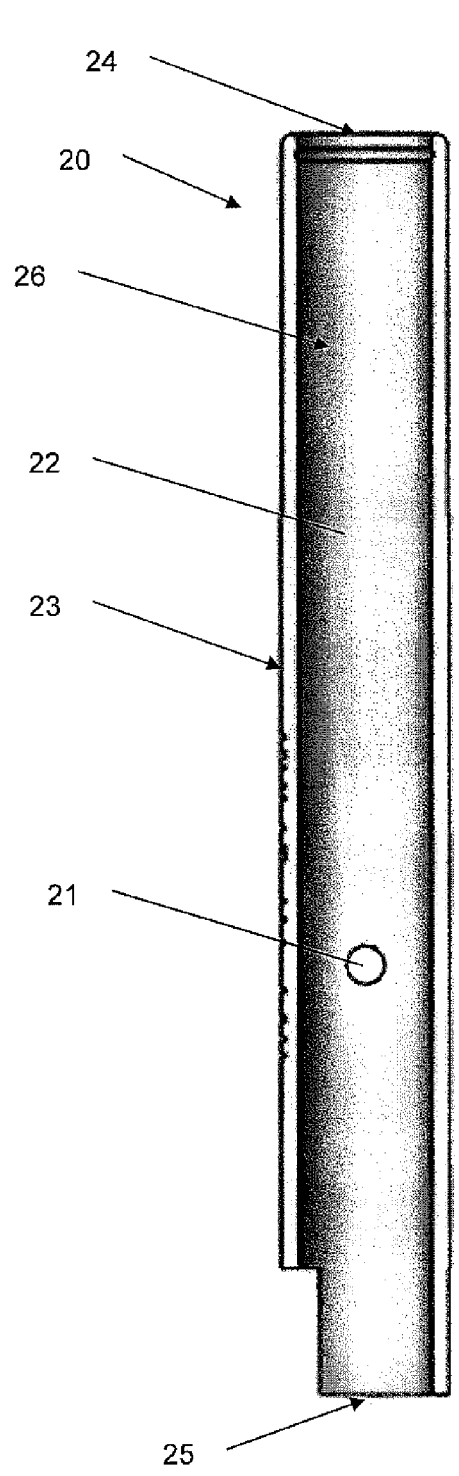
FIG. 2a is a cross-sectional view of an outer sleeve of a feeder tube according to one embodiment.
Figure 2B:
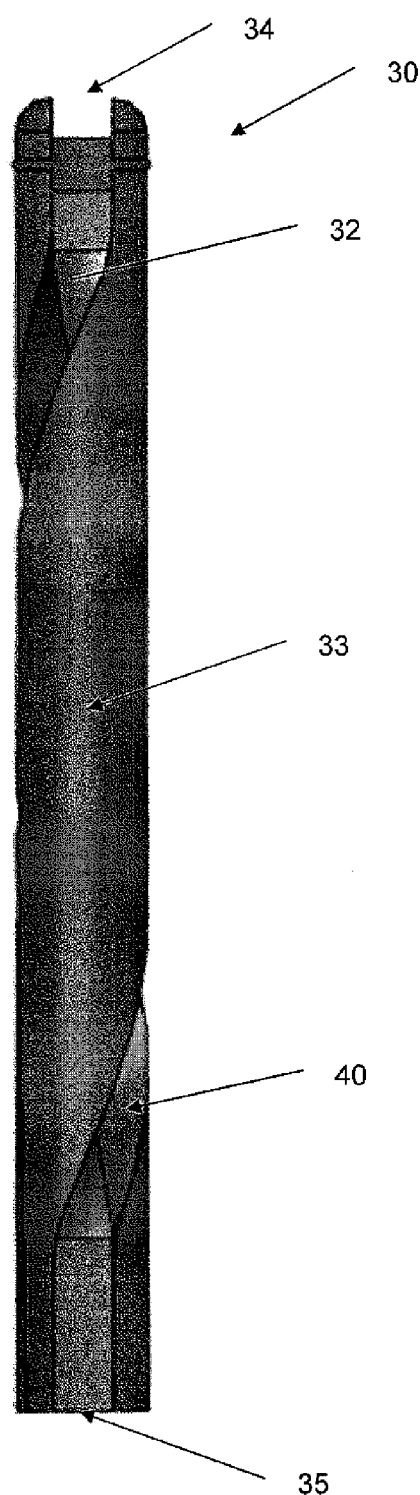
FIG. 2b is a side view of an inner core of a feeder tube according to one embodiment.

One embodiment of a feeder tube 10 is shown in FIGS. 1-2b. The feeder tube 10 includes an outer sleeve 20 and an inner core 30. The outer sleeve 20 includes an opening or a bore 26 extending therethrough so as to define an inner surface 22 and an outer surface 23. In particular, the outer sleeve 20 may include a bore 26 extending from an outer sleeve inlet side 24 to an outer sleeve exit side 25. In this embodiment, the outer surface 23 defines a substantially right circular cylinder. However, in other embodiments, the outer surface 23 may define other shapes or contours, including, for example, a helical outer contour, a rectangular contour, and/or other shaped contours.

According to one embodiment, the feeder tube 10 includes an inner core 30. The inner core 30 may include an inner core inlet side 34 and an inner core exit side 35. The inner core inlet side 34 may correspond with the outer sleeve inlet side 24, and the inner core exit side 35 may correspond with the outer sleeve exit side 25. Further, the inner core 30 may comprise an outer surface 33, the outer surface defining a passageway 32 thereon such that positioning the outer sleeve 20 over the inner core 30 defines a delivery chute for delivering a plurality of pills 5 between the passageway 32 and the inner surface 22 of the outer sleeve. Further, positioning the outer sleeve 20 over the inner core 30 defines a delivery chute for delivering a plurality of pills 5 from the inlet side 24, 34 of the inner core and the outer sleeve to the exit side 25, 35 of the inner core and the outer sleeve. In one embodiment of the present invention, the bore 26 of the outer sleeve 20 is configured to receive the inner core 30 therethrough so as to be coupled together. The inner core 30 may be a variety of shapes corresponding to the shape of the outer sleeve 20, such as cylindrical. The inner core may be coupled to the outer sleeve using a variety of techniques, such as for example, by a friction fit, welding, fasteners, adhesives, or bond.

In one embodiment of the present invention, the outer surface 33 of the inner core may define a helical passageway 32 thereon such that a helical delivery chute is defined between the helical passageway and the inner surface 22 of the outer sleeve. Thus, the helical delivery chute 40 may be defined in part by the inner surface 22 of the outer sleeve and the helical passageway 32. Accordingly, the helical delivery chute 40 may comprise a helical passageway 32 defined in the outer surface 33 of the inner core. As such, when the inner core 30 is coupled to the outer sleeve 20 and is disposed within the bore 26 of the outer sleeve, the inner surface 22 of the outer sleeve, along with the passageway 32 collectively define, in part, the helical delivery chute 40 of the feeder tube. Furthermore, the helical delivery chute 40 may extend from an inlet side of the feeder tube to an exit side of the feeder tube. Although described above that the passageway 32 is defined on the outer surface 33 of the inner core, it is understood that in another embodiment, the passageway may be defined on the inner surface 22 of the outer sleeve. Thus, the delivery chute may be defined between a passageway 32 on the outer sleeve 20 and an inner core 30 without a passageway (e.g., a smooth outer surface).

In another embodiment of the present invention, the outer sleeve 20 includes at least one aperture 21 which extends from the outer surface 23 to the inner surface 22 of the outer sleeve. The at least one aperture 21 may be configured to receive a pin therethrough. Further, the outer sleeve 20 and the inner core 30 may be rotationally aligned when coupled together such that the at least one aperture 21 may provide access to the passageway 32 of the inner core 30, and accordingly, the helical delivery chute 40. The feeder tube may include at least one such aperture configured to receive a pin 29 therethrough, the pin 29 configured to extend through the aperture and into the passageway so as to block movement within the helical delivery chute 40. As such, according to one embodiment, the feeder tube may include a pin configured to selectively permit the flow of pills through the helical delivery chute, the pin being engaged by a controller to selectively permit the flow of pills. In one embodiment, the pin 29 is formed of a thin, flexible material such as a polymer or metal. In one advantageous embodiment, the pin is formed of Delrin®, a product of DuPont.

The helical delivery chute 40 has the shape of a helical elongate member. The term "helical" in the context of embodiments of the present invention is meant to include a shape defined in the path of a helix, for example a circular helix, which spirals about, and is offset from, a central axis. In the case of a circular helix, the offset distance between the centerline of the helix and the central axis is the same at all points along the centerline. It is understood that the offset distance may be increased or decreased, and need not necessarily be a circular helix, depending on the type of pill and rate of delivery among other factors. In one particular embodiment of the present invention shown in FIG. 2b, the helical delivery chute is disposed offset from a centerline of the inner core.

Two characteristic measures of a helical, thread-like shape are pitch and lead length. Pitch is defined as the distance between successive similar sections of the helical delivery chute 40 that occur in a path parallel to the central axis of the helical delivery chute 40. Lead length is the distance that each pill 5 travels in the direction of the central axis of the helical delivery chute 40 as the pill rotates one revolution. For example, the pill may rotate at least one complete revolution between the inlet and outlet of the inner core. Thus, the pitch and lead length may determine the number of rotations of the pill as the pill proceeds through the feeder tube. Increasing the lead length of the delivery chute may permit each pill to slide more easily through the chute, while decreasing the lead length may decrease the incidence of shingling of the pills upon one another. Thus, the ideal lead length for a particular type of pill varies depending on the characteristics of the pill, including the shape, size, and surface texture, as well as the variation in characteristics between pills of a common lot.

Figure 3A:
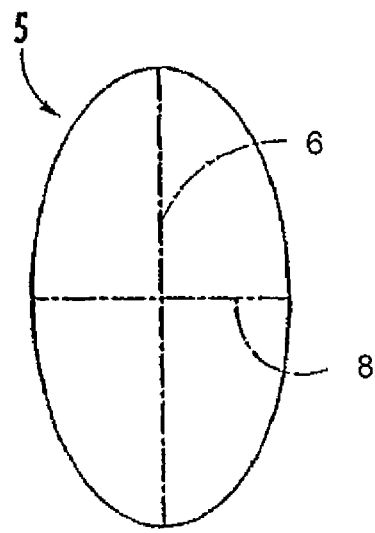
FIG. 3a is a front view of an exemplary pill for use with embodiments of the present invention.
Figure 3B:
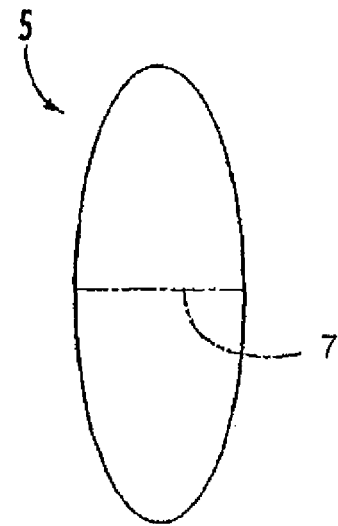

As shown in FIGS. 1-2b, the helical delivery chute 40 may have a cross-sectional shape of a polygon, such as a rectangle, which is uniformly rotated along the length of the helical delivery chute 40. The polygon shape of the cross section of the helical delivery chute 40 corresponds to the shape of the inlet 34 and exit 35 of the inner core 30. The common shape of the cross section of the helical delivery chute 40, inlet 34, and exit 35 of the inner core is designed to accommodate and correspond to the shape of the pills 5, which are fed through the helical delivery chute 40 of the feeder tube 10. The pills 5 may have a variety of shapes such as, for instance, a pill defining a major dimension 6 and first and second transverse dimensions 7, 8. An exemplary pill 5 is shown in FIGS. 3A and 3B. The first and second transverse dimensions 7, 8 are perpendicular to the major dimension 6, and the first transverse dimension 7 may be shorter than the second transverse dimension 8. The second transverse dimension 8 is equal to or shorter than the length of the major dimension 6. Additionally, when the pills 5 are disposed in the helical delivery chute 40 and proceeding in a direction generally parallel to the direction of the major dimension 6, the first and second transverse dimensions 7, 8 generally correspond to the dimensions of the cross section of the helical delivery chute 40. As the pills 5 proceed, for example, by falling through the helical delivery chute 40, each pill 5 is forced to rotate about an axis parallel to its major dimension 6.

Figure 3C:
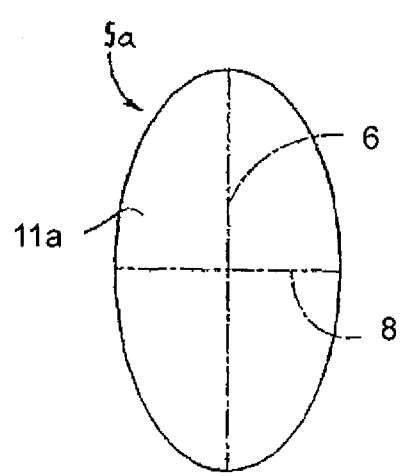
FIG. 3c is a front view of another exemplary pill for use with embodiments of the present invention.
Figure 3D:
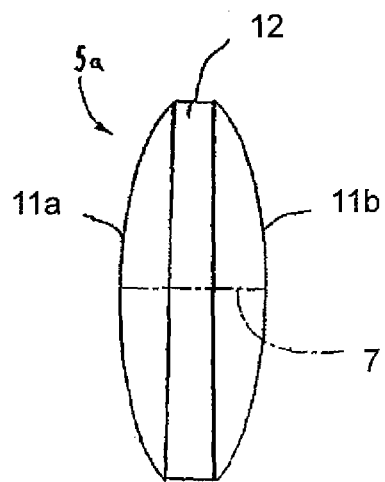
FIG. 3d is a side view of the exemplary pill for use with embodiments of the present invention, as shown in FIG. 3c.

FIGS. 3C and 3D illustrate another exemplary pill 5a, which defines opposed surfaces 11a, 11b and an elliptical portion 12 therebetween. The pill 5a similarly defines the major and first and second transverse dimensions 6, 7, 8. The opposed surfaces 11a, 11b are convexly curved such that the first transverse dimension 7 is the equal to a sum of a width of the elliptical portion 12 and an eccentricity of each of the surfaces 11a, 11b. It has been observed that a relatively shorter lead length may be preferred for pills 5a with surfaces 11a, 11b of increased eccentricity, and a longer lead length may be preferred for pills 5a with wider elliptical portions 12. For example, in one embodiment, the first transverse dimension of the pill 5a is about 0.125 inches, the elliptical portion 12 being about 0.060 inches in width and each surface 11a, 11b having an eccentricity of about 0.0325 inches, and the lead length of the helical delivery chute is about 2 inches. It is understood that the pills 5, 5a as well as other alternative shapes and sizes of the pills 5, 5a can be used with embodiments of the feeder tube and packaging apparatus of the present invention.

Due to the rotation of the pills 5 as they proceed through the helical delivery chute 40, adjacent pills 5 in the helical delivery chute 40 are positioned in successive rotational positions. Thus, if multiple pills 5 are positioned adjacently in the helical delivery chute 40, the first transverse dimension 7 of each pill 5 is not parallel to the first transverse dimension 7 of the immediately adjacent pills 5. The successively rotated positions of the adjacent pills 5 decrease the likelihood that each pill 5 will become wedged between an adjacent pill 5 and the helical delivery chute 40. Thus, the pills 5 are less likely to shingle upon one another and block passage of pills 5 through the helical delivery chute 40.

A packaging apparatus may include a pill delivery apparatus supported by a frame. The pill delivery apparatus may include a feeder tube 10 as described above, a tray 50 located above the feeder tube 10, and a drop chute located below the feeder tube 10. The pills are disposed on the tray and fed into the delivery chute of the feeder tube 10. After falling through the feeder tube, the pills enter the drop chute, which further guides the pills toward the receptacles. In one embodiment, the tray 50 may be rotatable and/or displaceable to facilitate delivery of the pills through the feeder tube. Moreover, the packaging apparatus may also include a conveyor for moving containers adjacent to the pill delivery apparatus for filling the containers. Further details regarding the delivery of pills using an exemplary packaging apparatus may be found in U.S. Pat. Nos. 7,066,350, 7,007,821, 7,124,912, and 7,892,473 to Aylward, each of which is incorporated herein by reference in its entirety.

According to one embodiment of the present invention, the feeder tubes 10 and other components of the pill delivery apparatus may be formed from a variety of materials including, but not limited to, plastic, aluminum, steel, or other polymers or metals. The choice of material depends upon such factors as material cost, manufacturing time and cost, and such material characteristics as strength, durability, flexibility, and surface roughness. In one advantageous embodiment, the feeder tube 10 and other components of the pill delivery apparatus are formed of Delrin®, a product of DuPont. In another embodiment of the present invention, the feeder tube 10 and other components of the pill delivery apparatus are formed of aluminum. Using aluminum at least in part for both the inner core and outer sleeve advantageously dissipates static electricity and avoids the buildup of an attractive static electricity force between a pill and a plastic feeder tube that might prevent the pill from falling through the feeder tube.

The feeder tubes 10 can be formed by injection molding, casting, fused deposition modeling, or a variety of rapid prototyping methods such as computer numerical control machining. In one preferred embodiment, the outer sleeve 20 and the inner core 30 of the feeder tube 10 is formed by computer numerical control machining, in which a material, such as aluminum, is machined by milling, drilling, tapping, reaming, boring, grooving, and other machining processes that are traditionally known in the art. As such, the computer aided machining process provides at least one advantageous aspect of the present invention, such as precise and accurate manufacturing of the inner core and outer sleeve. For example, CNC machining may be employed to form the inner core, form the outer sleeve, define the passageway in the inner core, and/or form the opening in the outer sleeve. By using such forming techniques, the passageway may be smooth and uninterrupted, as well as dimensionally consistent, while the inner core and outer sleeve may be formed of durable materials. For example, FIGS. 1-2b illustrate a feeder tube 10 according to one embodiment of the invention that has been formed by computer numerical control machining.

It will be understood that a pill delivery apparatus according to embodiments of the present invention can comprise any number of feeder tubes 10 for simultaneously filling a plurality of containers or pill receptacles. Each feeder tube 10 can include any number of helical delivery chutes 40. Also, while drop chutes are used in exemplary embodiments described above, the feeder tubes 10, in an alternative embodiment, may guide the pills 5 directly to the containers or pill receptacles. The feeder tubes 10 and the drop chutes may also be straight or curved along the length thereof.

Accordingly, embodiments of the present invention may provide advantages and improvements over the prior art for manufacturing a feeder tube for a pill delivery apparatus. In addition, embodiments of the present invention may provide advantages over the prior art for delivering and packaging pills, tablets, capsules, and the like. One advantageous aspect of embodiments of the present invention includes easier methods of fabricating, forming, or machining a feeder tube for a pill delivery apparatus. Unlike other manufacturing methods, such as filament deposit methods, embodiments of the present invention may provide smoother and more dimensionally consistent internal passageways, which may allow for the usage of such a feeder tube on otherwise problematic pill shapes, sizes, or surfaces.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A feeder tube adapted to deliver pills to a container, the feeder tube comprising:
    an inner core having an outer surface and a passageway defined on the outer surface thereof, wherein the inner core is formed at least in part from aluminum and the passageway is helical along at least a portion of the length of the passageway; and
    an outer sleeve comprising an opening defined therethrough, the opening having an inner surface, wherein the outer sleeve is formed at least in part from aluminum; wherein the outer sleeve is configured to be positioned over the inner core such that a delivery chute for delivering pills is defined between the passageway and the inner surface of the outer sleeve and the pills are fed by gravity along the passageway of the feeder tube.

2. A feeder tube of claim 1, wherein the delivery chute is configured to rotate each pill at least one revolution as the pill proceeds therethrough and deliver pills therethrough such that each of a plurality of pills successively delivered through the helical delivery chute is oriented at successive rotational positions along the helical delivery chute so as to prevent jamming of the pills with respect to the other pills in the delivery chute.

3. A feeder tube of claim 1, wherein the passageway is disposed offset from a centerline of the inner core.

4. A feeder tube of claim 1, wherein the inner core comprises an inlet side and an exit side opposed to the inlet side, and wherein the passageway extends from the inlet side to the exit side.

5. A feeder tube of claim 1, wherein the passageway is configured to rotate each pill a plurality of revolutions as the pill proceeds therethrough.

6. A feeder tube of claim 1, wherein the outer sleeve comprises at least one aperture defined therein, the aperture configured to receive a pin therethrough such that the pin extends into the passageway.

7. A feeder tube of claim 1, wherein the inner core is generally cylindrical in shape.

\* \* \* \* \*